Figure 1:
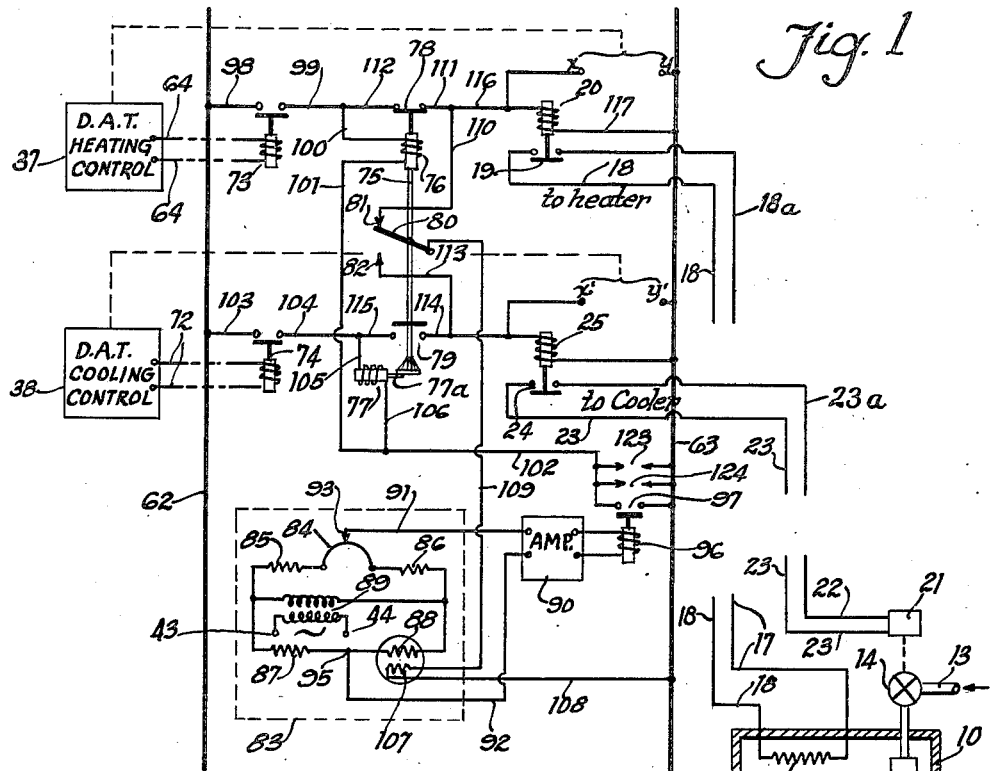

May 6, 1952  E. T. DAVIS  2,595,644
CONTROL SYSTEM
Filed Dec. 31, 1948  2 SHEETS—SHEET 1

INVENTOR.
Elwood T. Davis
BY
Woodcock and Phelan
Att'ys

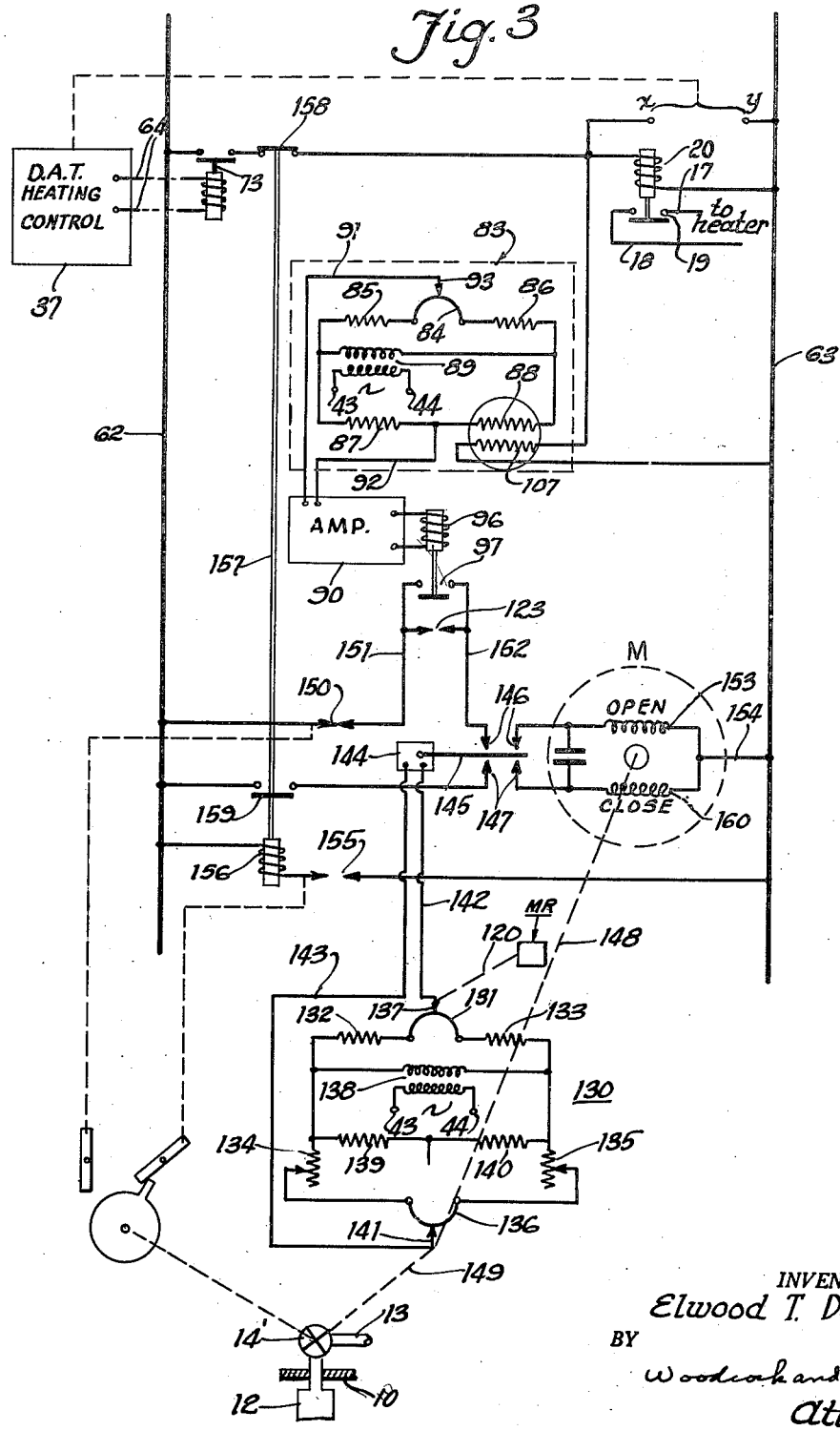

UNITED STATES PATENT OFFICE 2,595,644

CONTROL SYSTEM

Elwood T. Davis, Brookline, Pa., assignor to Leeds and Northrup Company, Philadelphia, Pa., a corporation of Pennsylvania Application December 31, 1948, Serial No. 68,684

20 Claims. (Cl. 257—3)

This invention relates to control systems for maintaining the magnitude of a condition such, for example, as temperature, within predetermined limits, more particularly to systems for controlling a plurality of separate condition changing means respectively effective to produce changes of opposite sense in the magnitude of the condition under control; and the invention has for an object the provision of simple and reliable systems for automatically bringing into operation the condition changing means of the proper sense to maintain the condition within proper limits.

While the invention is broadly applicable to the control of the magnitude of various conditions such as temperature, pressure, ion concentration, pH values or other physical, chemical or electrical conditions, it is particularly suited to, and is herein described in connection with, control systems wherein the maintenance of a predetermined temperature may require the control of either a heating agent or a cooling agent. In cases where a particular process is to be maintained at a desired temperature by the application of either heating or cooling means, there arises not only the problem of automatically selecting the proper medium to maintain the desired control temperature, but in order to avoid upsetting the control system, the transfer from one medium to the other should preferably be made only after one of the control mediums has substantially throttled off. In other words, both the heating and the cooling mediums should not be applied simultaneously in such a way that the effect of one cancels the other.

In control systems of this character heretofore provided, various arrangements have been employed for controlling the transfer from one medium to the other, and while such prior systems have been highly satisfactory in many respects, some difficulties have been encountered from the standpoint of initial expense and servicing and accordingly it is a further object of this invention to provide an improved system of this character which is characterized by its simplicity, by the substantial elimination of moving parts, by the consequent freedom from service requirements, and by its dependence upon a condition-integrating effect for the transfer from one medium to the other.

In carrying out the invention in one form a control system is provided for controlling separate condition changing means respectively effective to produce changes of opposite sense in the magnitude of the condition under control, such, for example, as the control of a heating medium and a cooling medium, which system comprises a first control means responsive to departure from the condition from a predetermined value for rendering effective a first of the condition changing means, which operates in one manner, as by controlling the addition of heat, and a second control means responsive to departures of the opposite sense for rendering the other of the condition changing means effective for operation in a different manner, as by subtraction of heat, together with means for disabling the second control means so long as the integrated control effect of the first condition changing means is above a predetermined minimum, the disabling means including a balanceable network and a balance influencing element energizable from the first control means in proportion to the degree to which the first condition changing means is rendered effective by its associated control means. Where the condition is under control of the second condition changing means, the transfer back to the first condition changing means may be made dependent upon a decrease of the integrated control effect below that minimum degree, or the transfer of one may be made dependent upon operation of its condition changing means to a selected one of its control limits.

More particularly the disabling means comprises a balanceable network having an impedance in one arm thereof which is associated with a heating element adapted to be energized from either of the control systems, so as to maintain the other control system disabled until the heat input to the heating element falls below a predetermined level, whereupon the balance of the network will be changed in a direction to render the disabling means ineffective, thereby permitting transfer to the other control means in the event that application of the other condition changing means is required to maintain the predetermined condition.

Figure 2:
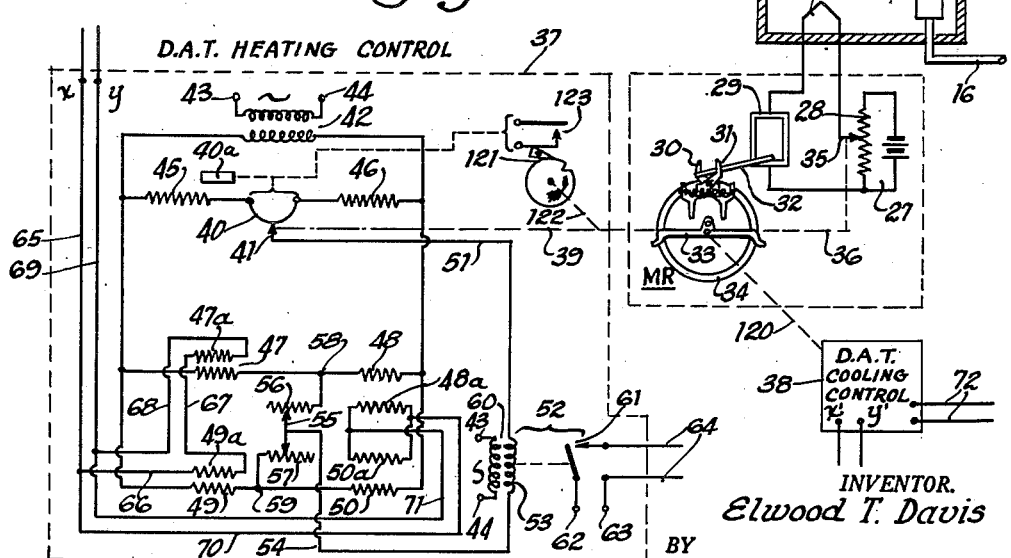

For a more complete understanding of the invention, reference should now be had to the drawings, in which:

Fig. 1 diagrammatically illustrates a control system embodying the present invention;

Fig. 2 diagrammatically illustrates in greater detail the components of one of the control means, i. e. the heating control, employed in the system of Fig. 1; and Fig. 3 diagrammatically illustrates another form of control system embodying the invention.

Referring now to the drawings, it is believed that a clear understanding of the arrangement and operation of the system will best be understood from a complete description of the operation of the system as a whole. Therefore, the construction and arrangement of certain of the mechanisms and component parts of the system will be first described in detail. Referring first to Fig. 2, the invention has been illustrated as applied to the control of the temperature within an enclosure such as a furnace or heat treating chamber 10 having mounted therein suitable heating means such as a heating resistor 11 and a suitable cooling means which is illustrated as comprising a heat exchanger 12 supplied by cooling fluid from an inlet pipe 13 under the control of a suitable valve 14, the cooling fluid after passage through the heat exchanger 12 being discharged by way of an outlet pipe 16.

The heating resistor 11 is connected as shown through suitable leads 17 and 18 to a suitable source of energy (not shown). Lead 17 may be connected directly to one side of the source while lead 18 is connected to the opposite side 18a through the contacts 19 of a contactor or relay 20 (Fig. 1). Operation of the control valve 14 between on and off positions in order to control the flow of the cooling medium to the heat exchanger 12 may be accomplished by any suitable device 21 which is connected through suitable leads 22 and 23 to a source of energy (not shown). Lead 22 may be connected directly to one side of the source while lead 23 is connected to the opposite side 23a by way of the contacts 24 of a control contactor or relay 25 (Fig. 1). The device 21 may be of any suitable construction, such for example as the reversible motor M3 and the cooperating limit switches illustrated in my prior Patent No. 2,424,305, issued July 22, 1947, for Control System, or the device 21 may take the form of a suitable solenoid for effecting the desired opening and closing of the valve.

The temperature within the enclosure or furnace 10 is detected or measured by any suitable means such as a thermocouple 26 connected as shown to a balanceable network 27 of the potentiometer type which includes a slide wire 28. Though a galvanometer 29 has been shown as forming a part of a sensitive measuring device of the mechanical relay type such, for example, as is disclosed in Squibb Patent No. 1,935,732 issued November 1, 1933, it is to be understood other devices may be used such as the measuring devices of the type shown in Williams Patent 2,113,164. The mechanical relay MR includes a pair of feelers 30 and 31 (corresponding to the feelers 22 and 22a of the aforementioned Squibb patent) which serve, after clamping of the pointer 32 of the galvanometer, to position a pivoted clutch member 33. Suitable cam members (not shown) are effective thereafter to move a second clutch member 34 in one direction or the other, depending upon the sense of the unbalance and by an amount dependent on the extent of the unbalance of the galvanometer 29. If the potential difference of the thermocouple 26 exceeds that of the potentiometer 27, the clutch member 34 will be rotated and will in turn adjust the slide wire 28 relative to its contact 35 (the connection therebetween being indicated by the broken line 36) in a direction to establish balance between the two potential differences.

In accordance with the present invention, the mechanical relay MR also serves to control a pair of separate control units comprising a heating control unit 37 and the cooling control unit 38 indicated diagrammatically in Fig. 1. Since these control units are identical in construction and arrangement except for the polarity of response, only the heating control unit 37 is illustrated in detail in Fig. 2 and only this one unit will be described.

As indicated by the broken line 39, the mechanical relay MR also serves to position a slide wire 40 in the control unit 37 with respect to its contact 41. The slidewire 40 forms a part of a balanceable network which is energized from a transformer 42 whose primary winding is connected to a suitable source of alternating current supply, as indicated by the terminals 43 and 44. As shown, the slide wire 40 is connected in series with a pair of end coils or resistors 45 and 46 to form two arms of a balanceable network or bridge, the other arms of which comprise suitable resistors 47, 48, 49 and 50. As shown, the contact 41 of the slide wire 40 is connected by means of a conductor 51 to one winding 53 of a balance-detecting device 52, the other terminal of the winding 53 being connected by a conductor 54 to the movable contacts 55 of a pair of adjustable resistors 56 and 57, which are respectively connected, as shown, to the point 58 between the resistors 47 and 48 and to the point 59 between the resistors 49 and 50.

The balance detecting device 52 may be of any suitable type such, for example, as thermionic detecting means, but for purposes of illustration it has been shown as constituting a contact making electrodynamometer, the other winding 60 of which is connected across the same alternating current supply represented by the terminals 43 and 44. Whenever an unbalance of a predetermined sense occurs, the device 52 operates to close a pair of contacts 61 to close a suitable circuit extending from the source of energy represented by the terminals 62 and 63, through suitable conductors 64, as will be more fully explained hereinafter. Upon the occurrence of an unbalance in the opposite sense, the contact 61 will be opened by the consequent action of the device 52.

As will be more fully explained hereinafter, closure of the contact 61 of the device 52 is effective among other things to complete a circuit across the terminal points $x$ and $y$ so as to energize a plurality of heating resistors 47a, 48a, 49a and 50a. The circuit for the heating resistors 47a and 49a extends from the terminal point $x$ through a conductor 65, a conductor 66, the heating resistor 49a, a conductor 67, the heating resistor 47a, and by way of conductors 68 and 69 to the terminal point $y$. Likewise, the circuit for the heating resistors 48a and 50a may be traced from the terminal point $x$ through the conductors 65 and 70, through the heating resistors 48a and 50a in parallel, and by way of the conductors 71 and 69 to the terminal point $y$. The network including the heating coils or resistors 47a to 50a, inclusive, is generally similar to the networks described in my aforesaid prior Patent No. 2,424,305 (Fig. 1) and in my prior Patent No. 2,325,232 issued July 27, 1943 (Figs. 5 and 6).

As more fully explained in these prior patents, the network resistors 47 to 50, inclusive, are preferably of nickel or other material having a substantial positive temperature coefficient and each of the heating coils 47a to 50a is wound on the same form as its associated resistor 47 to 50. The assemblies 48—48a and 50—50a are designed for a low thermal inertia and correspond to the "proportional action thermal converter assemblies" referred to in my aforesaid Patent No. 2,325,232, while the assemblies 47—47a and 49—49a are of substantially different thermal inertia and comprise the "droop-corrector terminal converter assemblies" referred to in my aforesaid patent.

As previously indicated, the control unit 38 is identical with the control unit 37, except that the polarity is reversed. As the control unit 37 is effective, through relative adjustment of slide wire 40 and contact 41 by the temperature responsive mechanical relay MR, to close its contacts 61 when application of heat is necessary in the enclosure 10, so will the control unit 38 be effective to close its corresponding contacts to complete a circuit through the conductors 72 when application of the cooling medium is required in the enclosure 10 in order to maintain the desired temperature therein.

In addition to the arrangements thus far described, the control units 37 and 38 may have associated therewith if desired suitable program control means such, for example, as are disclosed in my prior Patent No. 2,424,305 for varying the control point of the process in accordance with a predetermined schedule. Condition control units of the type represented by the units 37 and 38 are known in the art, and are available on the market under the designation "Duration Adjusting Type" control, such units being characterized by the fact that the condition controlling medium such as the heating means or the cooling means may be operated between selected maximum and minimum positions to provide condition changing pulses of variable duration, the ratio of on-time to off-time being controlled so that the average effect thereof is exactly proportioned to the demand.

Referring now to Fig. 1 of the drawings, it will be observed that the heating control unit 37 is arranged to control, through the conductors 64, the energizing winding of a suitable heat control relay 73, while the cooling control unit 38 is arranged to control, through its conductors 72, the energizing winding of a similar cooling control relay 74. Associated with the relays 73 and 74 is a transfer means shown as switching device or contactor 75 of the latched-in type, having a closing winding 76 and a trip coil 77. As shown, the contactor 75 is provided with a pair of contacts 78 connected in circuit with the contacts of the heat control relay 73 and with a pair of contacts 79 connected in circuit with the contacts of the cooling control relay 74. In addition the contactor 75 is provided with a contact 80 adapted selectively to engage a pair of spaced stationary contacts 81 and 82, for accomplishing control functions to be more fully described hereafter.

Associated with the contactor 75 and the relays 73 and 74 is a balanceable network or bridge unit 83 comprising a slide wire 84, a pair of end coils or resistors 85 and 86 and additional resistors 87 and 88. As shown, the network 83 is energized through a suitable transformer 89, the primary winding of which is connected to the alternating current source 43—44. Associated with the network 83 is an amplifier 90 which may be of any suitable type well known in the art and which has its input circuit connected through the conductors 91 and 92 to the contact 93 of the slide wire 84 and to a point 95 in the network intermediate the resistors 87 and 88. The amplifier, as shown, has its output circuit connected so as to effect energization or deenergization of the operating winding of a transfer relay 96, the contacts 97 of which are arranged for partially completing energizing circuits for the closing winding 76 and the tripping winding 77 of the contactor 75. The energizing circuit for the closing winding 76 may be traced from the source conductor 62 through a conductor 98, the contacts of the relay 73 when this relay is closed, conductors 99 and 100, the closing winding 76, conductors 101 and 102 and by way of the contacts 97 to the source conductor 63. Similarly the energizing circuit for the tripping winding 77 of the contactor 75 may be traced from the conductor 62 through a conductor 103, the contacts of the relay 74 when this relay is closed, the conductors 104 and 105, the tripping winding 77, the conductors 106 and 102 and by way of the contacts 97 to the conductor 63.

In accordance with the present invention, the network or bridge resistors 87 and 88 are formed of nickel or other material having a suitable temperature coefficient and a heating coil 107 is associated with the resistor 88 for varying the temperature and consequently the impedance thereof, so as to influence the balance of the network 83, the heating coil 107 being connected for energization from either the heating control means or the cooling control means depending upon the position of the contactor 75. Thus one terminal of the heating coil 107 is connected to the conductor 63 by way of a conductor 108 and the other terminal of the heating coil is connected by way of a conductor 109 to the contact 80 of the contactor 75. From the contact 80 the circuit for the heating coil 107 is completed either through the upper contact 81, conductors 110 and 111, the contact 78, conductors 112 and 99, and by way of the contacts of the heat control relay 73 and the conductor 98 to the source conductor 62, or through the lower contact 82, the conductors 113 and 114, the contacts 79, the conductors 115 and 104, and by way of the contacts of the cooling control relay 74 and the conductor 103 to the conductor 62.

With the above understanding of certain of the parts and components of the system and their organization with respect to each other in the system, it is believed that a comprehensive understanding of the invention may be had from a description of the operation of the system as a whole. As shown in Fig. 1, the transfer means comprising contactor 75 is shown in its latched-in position wherein it is held by the latch 77a associated with the trip coil 77 even though the energizing circuit to the closing coil 76 is interrupted at the contacts of the relay 73. It will be assumed that the temperature to which the thermocouple 26 in the chamber 10 is being subjected is lower than that predetermined temperature for which the system is adjusted, i. e. the control point, and consequently upon operation of the relay MR, Fig. 2, to move the slide wire 40 to bring its contact 41 nearer end coil 45, a potential difference will appear between the contact 41 of the slide wire 40 and the points 58 and 59 of the heating control network. This potential difference is applied to the detector device 52 and since heat is being called for in the chamber 10, the polarity of this potential difference is such as to close the contacts 61, thereby to energize the heat control relay 73 through the conductors 64. Closure of the relay 73 completes an energizing circuit for the auxiliary heat control relay 20, which circuit extends from the source conductor 62, through the conductor 98, the contacts of relay 73, conductors 99 and 112, the contact 78 of the contactor 75, conductors 111 and 116, the operating winding of the relay 20 and by way of a conductor 117 to the source conductor 63. Consequently the auxiliary relay 20 closes its contacts to energize the heating element 11 within the enclosure 10, thereby tending to raise the temperature therein. In addition, energization of the heating control relay 73 closes a circuit to the terminal points $x$—$y$ as clearly indicated in Fig. 1, so as to energize the heater coils 47a and 49a, Fig. 2, connected in series and the heater coils 48a and 50a connected in parallel.

As fully explained in my aforesaid prior Patent No. 2,325,232 and in my Patent No. 2,300,537, issued November 3, 1942, these heating coils cyclically change the resistance of their associated resistors 47—50 so as to impart to the network the characteristics which provide the desired control of the temperature within the enclosure 10. In brief, the thermal inertias of the assemblies 48—48a and 50—50a materially differ from those of the assemblies 47—47a and 49—49a. The differing degree of change in resistance values of the resistors 47—50 is utilized to produce the desired control characteristics. If the heat load is small (either for heating or cooling), the periods of energization of the heating coils will be small compared with the periods of deenergization, while if the heat load is great, the periods of deenergization will be small compared with the periods of energization. The system as a whole responds to the heat load and maintains the desired conditions for any heat load within the capability or capacity of the system.

Upon closure of the heat control relay 73 and the consequent energization of the heater 11, one or more of several things may occur. Normally, the heater coils 47a and 50a so change the characteristics of the network as to balance the network and cause the potential difference at the detector device 52 to disappear. The heating resistor 11 may increase the temperature of the enclosure 10 an amount which, through the thermocouple 26 and the mechanical relay MR, may readjust the relative positions of the slide wire 40 and its contact 41. Normally, the system controlling contact 61 and consequently the heat control relay 73 cyclically operate as a modulating means to establish a ratio of on-time to off-time dependent upon the demand for heat. If the demand is small, that ratio is small and relay 73 remains closed for a relatively small percentage of time.

During operation where the temperature of the enclosure 10 is held to a relatively high value and there are substantial heat losses, there is a heavy heating load, and the system by cyclical change in unbalance of the control networks functions automatically to provide pulses of energization to the heating resistor 11 of higher ratio of on-time to off-time to maintain the temperature within the enclosure 10 substantially at the control point. However, should the heat requirements become progressively smaller, the relay 73 under the control of the detecting device 52 will remain closed for variable periods, the on-to-off-time ratio increasing with an increase in heat load, and decreasing with reduced heat load.

In accordance with the present invention, the control system functions automatically to prevent operation of the contactor 75, to transfer the system from the heat control unit 37 to the cooling control unit 38 so long as the ratio of on-time to off-time of the pulses of heating current supplied to the resistor 11 is above a predetermined minimum. Thus it will be observed that upon closure of the relay 73, the one of the previously traced alternative energizing circuits for the heating coil 107 which includes the contacts of the relay 73, was completed. Therefore, so that as long as substantial heating impulses are being delivered, the heating coil 107 will be energized to maintain the network resistor 88 at a sufficiently high resistance to affect the balance of the network 83 in such a direction as to cause the contacts 97 of the transfer relay to open and remain open. So long as these contacts are maintained open, the energizing circuit for the tripping winding 77 of the contactor 75 is interrupted and closure of the cooling control relay 74 through operation of the cooling control unit 38 is ineffective. However, as the average heat input to the resistor 11 over a period of time and consequently to the heating coil 107 decreases below a predetermined average level, the balance of the bridge 83 will be influenced, due to a drop in the resistance of the bridge resistor 88, in a direction to energize the relay 96 and cause it to close its contacts 97. After these contacts have closed any subsequent closure of the heat control relay 73 will again effect energization of the heating resistor 11 and the heating coil 107 so as to open the contacts 97 of the transfer relay 96. However, if with the contacts 97 closed the temperature within the chamber 10 varies from the control point in the direction requiring cooling, the mechanical relay MR will, through its connection to the cooling control unit 38, as indicated by the broken line 120, effect operation of the detecting device therein corresponding to the device 52, so as to close the cooling control relay 74, thereby energizing the tripping coil 77 and causing closure of the contacts 79 of the contactor 75, to complete an energizing circuit to the auxiliary cooling control relay 25 Closure of the auxiliary relay 25 effects energization of the operating device 21 as previously indicated, so as to supply cooling medium to the heat exchanger 12. Simultaneously an energizing circuit is completed to the points $x'$, $y'$ (Fig. 1) to energize the heating resistors in the unit 38 corresponding to the heating resistors 47a—50a in the unit 37. Likewise, the contact 80 of the contactor 75 engages the lower contact 82 associated therewith and completes the other of the previously traced heating circuits for the heating coil 107 so that this heating coil is now energized in accordance with the ratio of on-time to off-time of the cooling pulses applied through the heat exchanger 12. Consequently, the transfer relay 96 which opens upon energization of the heating coil 107, will remain open so long as the cooling impulses remain above a predetermined average level. It will thus be seen that the system automatically provides for the application to the chamber 10 of either heating or cooling impulses and permits transfer from the heating or cooling cycle only after the ratio of the on-impulse time to off-impulse time has decreased to a predetermined minimum.

More particularly, as soon as the temperature within the enclosure 10 again approaches the preselected temperature, that of the control point, the cooling control relay 74 will close less and less frequently and the temperature of the resistor 88 will decrease. With the decrease of temperature of resistor 88, the network 83 will become unbalanced to energize the relay 96 to close its contacts 97. If the temperature within the enclosure 10 then falls below the control point, the mechanical relay MR will relatively adjust the slide wire 40 with respect to the contact 41 for energization of relay 73. The closure of the contacts of that relay completes an energizing circuit for the operating coil 76 of contactor 75. The closure of contacts 78 completes the circuit for the coil of relay 20 which closes its contacts 19 to energize the heater 11, Fig. 2. The operation with relay 75 of the transfer switch 80 from contact 82 to contact 81 completes an energizing circuit for the heater 107 associated with the resistor 88 again to raise its temperature to bring the network 83 into balance for opening of the relay 96 to interrupt the circuit through its contacts 97. In this manner, there is automatic transfer of the control of the temperature in chamber 10 as between the heating control unit 37 and the cooling control unit 38.

The control point may be adjusted or selected by rotating a knob 40a which relatively adjusts slide wire 40 with respect to its contact 41. At the same time it rotates the switch assembly 123 relative to the cam 121. In practice the slide wire 40 and the cam 121 are ordinarily driven by the relay MR and the control knob 40a used to adjust the contact 41 and the switch assembly 123 in manner shown in Ross Patents 2,096,064 and 2,279,528. The particular arrangement used is immaterial and will be chosen in accordance with design consideration.

It may occur under some conditions that immediate transfer from heating to cooling or vice versa is desirable without waiting for the condition changing impulses to decrease below the set minimum value, and in accordance with the present invention this may be accomplished automatically by by-passing the contacts 97 of the transfer relay 96 upon the occurrence of abnormal conditions. If for example heating impulses are being applied, and a sudden and substantial shift of the control point is effected by manual or automatic rotation of knob 40a in a direction to lower the control point, the switch assembly 123 will be rotated clockwise for immediate closure of its contacts. At the same time slide wire 40 is rotated to bring its contact 41 nearer the end coil 46. The closure of assembly contacts 123 by-passes the contacts 97 of the transfer relay 96 so that the cooling control relay 74 which is closed by the cooling control unit 38 is immediately effective to apply cooling medium to the enclosure 10 without waiting for the heating impulses to throttle down sufficiently to effect closure of the transfer relay 96. A similar cam controlled switch is provided for the cooling control unit 38, having a cam operated by the mechanical relay and a contact assembly operated by the knob 40a, concurrently with adjustment of assembly contacts 123. The contacts 124 of the switch assembly for unit 36 are shown in Fig. 1. When closed, by rotation of control knob 40a, in a direction to raise the control point a substantial amount, they too provide for immediate transfer to the control unit 37. As soon as the condition under control approaches its new control point, one of the cams of switches 123 and 124 will operate to re-open its contacts. The limit switches 123 and 124 may, of course, be adjusted to operate in response to any predetermined degree of departure whether due to change in setting of the control point or otherwise.

The network 83 may be adjusted by means of the slide wire 84 and its contact 93 so as to provide for closure of the transfer relay 96 at any predetermined minimum ratio of the on-to-off periods of the heating or cooling pulses.

Although the heating control unit 37 and the cooling control unit 38 in the system shown in Figs. 1 and 2 are both of the duration adjusting type, it will be understood that the invention is not limited to systems employing this type of control for both mediums, and in Fig. 3 there is shown a control system embodying the present invention wherein the supply of cooling medium is under the control of a control unit of the type disclosed in my prior Patent No. 2,300,537 (Fig. 1) wherein the position of the control member is varied in accordance with the demand so as to vary incrementally the rate of supply of the cooling medium, rather than the duration of constant amplitude impulses of cooling medium. Systems of this latter type are available on the market under the designation P. A. T. or "Position Adjusting Type" controls.

Referring now to Fig. 3, the control means for the heating medium is of the type heretofore described in connection with Figs. 1 and 2 and similar reference numerals have been applied to Fig. 3 to indicate similar parts. It is not thought that a detailed description of the heating control means of the system shown in Fig. 3 is necessary, since the arrangement and operation thereof will be obvious from the drawing and from the foregoing description of Figs. 1 and 2. Briefly, however, when the heat control relay 73 is closed under the control of the heating control unit 37, an obvious circuit is established for the auxiliary heat control relay 20, so as to energize the heater 11 through the conductors 17 and 18 and the relay contacts 19 as in the previously described embodiment. Also the heating coil 107 will be energized in accordance with the ratio of on-time to off-time of the heating impulses so as to affect the balance of the bridge or network 83 and open the contacts 97 of the transfer relay 96, thereby disabling the control means for the cooling medium, as will be more fully described hereinafter. As soon as the ratio decreases to a predetermined minimum, the transfer relay 96 will reclose to complete at its contacts 97 a partial circuit, which permits the control means for the cooling medium to become effective immediately if cooling medium is called for by the mechanical relay MR operating in response to movements of the galvanometer 29.

As shown in Fig. 3, the cooling control means comprises a balanceable network 130 comprising a slide wire 131, end coils 132 and 133, a pair of adjustable resistors 134 and 135 and a second slide wire 136. The slide wire 131 and its contact 137 are adapted to be adjusted in accordance with the operation of the mechanical relay MR (Fig. 2) as indicated by the broken line 120 and the bridge or network 130 may be energized from a suitable transformer 138, the primary winding of which is energized from the source of alternating current 43—44. The adjustable resistors 134 and 135, together with a pair of auxiliary resistors 139 and 140, constitute portions of a supplementary bridge such as is disclosed in my prior Patent No. 2,300,537 for providing so-called "droop control," which may be employed to render the control system stable under varying conditions of load, and for further details as to the function and operation of these droop control circuits, reference should be had to the aforesaid prior Patent 2,300,537.

As shown, the contact 137 of the slide wire 131 and the contact 141 of the slide wire 136 are connected through the conductors 142 and 143 to relay 144, which may be of any suitable type such, for example, as a contact galvanometer, the relay 144 corresponding to the relay R of my prior Patent No. 2,300,537. The relay 144 is adapted selectively to operate a movable contact 145 so as to bridge opposed pairs of stationary contacts 146 and 147 arranged to control a reversible motor M. The motor M, as indicated by the broken lines 148 and 149, is arranged to operate a suitable control valve 14' for governing the supply of cooling medium to the heat exchange unit 12 through the inlet conduit 13, and at the same time relatively to adjust the slide wire 136 and its contact 141 for the purpose of rebalancing the bridge 130, as is more fully described in my aforesaid prior Patent No. 2,300,537.

It will now be assumed that, with the heating control 37 supplying heating pulses to the enclosure 10 having a ratio of on-time to off-time less than the minimum amount required to maintain the transfer relay 96 in its open position, the mechanical relay MR operates in a direction to call for application of cooling medium to the heat exchanger 12. Such movement of the mechanical relay MR will operate the slide wire 131 to unbalance the control bridge 130, thereby applying a potential to the relay 144 in a direction such as to cause the movable contact 145 to engage the stationary contacts 146. Thus an energizing circuit for the motor M is completed which extends from the source of energy represented by the conductor 62 through the limit switch 150, which is in its closed position so long as the valve 14' is closed, through a conductor 151, the contacts 97, a conductor 152, the contacts 145 and 146 and by way of the motor winding 153 and a conductor 154 to the other side of the source represented by the conductor 63.

Energization of the motor winding 153 thereupon effects operation of the motor M to open the valve 14' and readjust the control network 130, whereby cooling medium is supplied to the heat exchanger 12 in proportion to the amount of opening movement imparted to the valve 14' under the control of the bridge 130. As soon as the valve 14' moves from its closed position, a suitably arranged limit switch 155 closes to establish an obvious energizing circuit for the energizing winding 156 of a contactor 157. Operation of the contactor 157 is effective at its upper set of contacts 158 to interrupt the energizing circuit to the auxiliary heat control relay 20, thereby disabling the heat control means, and at its lower contact 159 the contactor 157 prepares a reverse energizing circuit for the motor M including the motor winding 160. It will thus be seen that operation of the relay 144, in accordance with potential differences of opposite polarity developed by the control bridge 130 under the control of the mechanical relay MR and the galvanometer 29, will effect movement of the contact 145 selectively to open and close the contacts 146 and 147 so as to rotate the motor in the desired direction to adjust the valve 14', and the heating control means will be rendered ineffective by the contactor 157 until such time as the motor M returns the valve to its fully closed position, thereby opening the limit switch 155 so as to deenergize the operating winding 156 of the contactor 157 and thereby close the contacts 158.

The switch 123, which is arranged as shown to by-pass the contacts 97 of the transfer relay 96, is arranged as described in connection with the embodiment shown in Figs. 1 and 2 to permit immediate shift from the heating to the cooling cycle in the event of a sudden and substantial departure of the temperature from the control point, without waiting for the heating control to throttle down to a minimum value.

In both forms of the invention which have now been described in detail, the balanceable network 83 is unbalanced in accordance with the ratio of the on-time to off-time of at least one of the condition changing means. In the modification of Figs. 1–2, the heater 107 is energized under the control of the relay 73 or the relay 74, depending upon which one is then effective to control its associated heat changing means, including the contactors 20, 25, the resistor 11, and the heat exchanger 12. Though the condition changing means 11 and 12 act on the condition under control in opposite directions, the heater 107 always acts on the element 88 to increase its impedance or resistance.

If the condition under control, the temperature of the enclosure 10, be at the control point, the balanceable network of the control unit 37 or 38 will change between a balanced and an unbalanced condition so as to produce that ratio of on-time to off-time which will maintain the temperature at the control point. More particularly, Fig. 2, assuming the system is operated on heating control, the heating resistors 47a—50a change the resistance values of their associated bridge resistors 47—50 each time the contactor 20 of Fig. 1 is closed to complete an energizing circuit. When the contactor 20 is in open circuit position, these heating resistors are deenergized and their associated bridge resistors begin to cool. There is thus introduced into the bridge or balanceable network of the heating control 37 the following effect. Neglecting other factors for the moment, as the bridge resistors 47—50 cool, or are heated, they act to change the balance of the bridge first in one direction and then in the other, the direction of the change of unbalance being in the sense or direction to operate the device 52 to close contact 61 as the result of cooling. Conversely, the unbalance as the result of heating is in the sense or direction which causes the device 52 to open the contact 61. With continued disregard of other factors, the described arrangement will cause the system to operate with a continuing predetermined ratio of on-time to off-time of contactor 20 controlling the heating medium represented by the resistor 11.

However, with a temperature change in the enclosure 10 the mechanical relay MR will relatively adjust the slide wire 40 with respect to its contact 41 and there will be departure from its previously assumed position illustrated at the mid-point of the slide wire 40. If the change in the temperature of enclosure 10 be below the control point, the contact 41 will be moved nearer the end coil 45. The result will be an increase in the ratio of the on-time to the off-time of the contactor 20 and resistor 11. This change in ratio is brought about by the corresponding change in the heating requirements of the bridge resistors 47—50, particularly resistors 48 and 50, which must be raised to a higher resistance value to rebalance the bridge. This means that the device 52 will close the contacts 61 and keep them closed to provide a higher ratio of on-time to off-time. That ratio will continue to rise until the temperature of the enclosure 10 rises and there is resulting adjustment by mechanical relay MR to return the contact 41 to its assumed mid-position.

The continued increase in the ratio of the on-time to off-time is due to the effect of bridge resistors 47 and 49 associated with heating resistors 47a and 49a, which bridge resistors due to their high thermal inertia slowly act in a direction to offset the balancing effect resulting from the rise in temperature of resistors 48 and 50. Consequently, resistors 48 and 50 will be progressively raised to a higher temperature, maintaining an advance over the rise of temperature of resistors 47 and 49 to produce rebalance in the lower arms of the bridge to offset the unbalance in the upper arm of the bridge including slide wire 40. This rise continues until the temperature of the enclosure 10 rises and the mechanical relay MR relatively adjusts contact 41 with respect to the slide wire 40 to rebalance the upper arm of the bridge. The lower arms of the bridge then maintain a balance between bridge resistors 48, 50 and bridge resistors 47, 49. Heating impulses are then delivered to the resistor 11 with a higher but now unchanging ratio of on-time to off-time. The balanceable network continues to function with the higher ratio of on-time to off-time to meet the greater demand or heat load which caused the previously described departure from the control point.

While further details of the foregoing operation will be found in my earlier referred to patents, this additional résumé of operation has been included by way of emphasis in connection with the operation of the associated balanceable network 83 of Fig. 1. In that network the resistor 107, energized in accordance with the ratio of the on-time to off-time, in one form of the invention has been shown as unbalancing the network 83 in one direction with that ratio above a predetermined value. As the ratio decreases below that predetermined value, the bridge or network 83 is unbalanced in the opposite direction to operate through the amplifier 90 to energize the relay 96 to close its contacts 97. By providing the resistor 107 and its associated bridge resistor 88 with thermal capacity, i. e., a mass to provide thermal inertia or control of the rate of change with time of the resistance, of bridge resistor 88, an integrating effect of the heating impulses is secured. The assembly including resistor 88 acts as an integrator. If the integrating effect drops below a predetermined minimum, the transfer relay 96 is energized and there is transfer of the control to the cooling control unit 38. While the system is under the control of unit 38, heating bridge resistors corresponding with 47a—50a similarly cooperate with their bridge resistors and that unit also includes a slide wire and contact corresponding with 40 and 41 of the unit 37.

However, the network 83 functions as before, but under the control of unit 38 the heating resistor 87 and its associated bridge resistor 88 serve to integrate the cooling impulses delivered by controller 38. The balanceable network 83, when the integrated impulses drop below a predetermined value, is again effective to energize the transfer relay 96 to close its contacts 97. Thus, with either the heating control 37 or the cooling control 38 effective, the transfer means is operated in accordance with an integrating effect or a decrease in the ratio of the on-time to the off-time below a predetermined value. That value may be selected or predetermined by manual adjustment of the contact 83 relative to its associated slide wire 84.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed is:

1. A system for controlling separate condition changing means respectively effective to produce changes of opposite sense in the magnitude of a condition, comprising first control means responsive to departures of said condition in one sense from a predetermined value for rendering one of said condition changing means effective, second control means responsive to departures of said condition from said value in the opposite sense for rendering the other of said condition changing means effective, means including a balanceable network for preventing operation of said last-named condition changing means under control of said second control means, and heating means energizable from said first control means for varying an impedance in said network in proportion to the effectiveness of said one condition changing means.

2. A system for controlling separate condition changing means respectively effective to produce changes of opposite sense in the magnitude of a condition, comprising separate condition responsive control means respectively associated with said condition changing means, switching means energizable from either of said control means for rendering the energizing one of said control means effective to control its associated condition changing means, means including a balanceable network for preventing operation of said switching means, and means controlled by the effective one of said control means for influencing the balance of said network in proportion to the output of said effective condition changing means, thereby to disable said preventing means when said network unbalance attains a predetermined value.

3. A system for controlling separate condition changing means respectively effective to produce changes of opposite sense in the magnitude of a condition, comprising separate condition responsive control means respectively associated with said condition changing means, switching means energizable from either of said control means for rendering the energizing one of said control means effective to control its associated condition changing means, means including a balanceable network for preventing operation of said switching means, and a heating element energizable by the effective one of said control means in proportion to the energization of said associated condition changing means for varying an impedance in said network, thereby to disable said preventing means when predetermined minimum condition changes are being effected.

4. A system for controlling separate condition changing means respectively effective to produce changes of opposite sense in the magnitude of a condition, comprising separate condition responsive control means including a balanceable network having circuit elements for cyclically changing the balance condition thereof for respectively rendering said condition changing means effective to supply condition changing pulses of varying duration, switching means energizable by either of said control means upon a departure of said condition from a predetermined control point, said switching means upon operation rendering the energizing one of said control means effective to control its associated condition changing means, means including a balanceable network for preventing operation of said switching means by said control means, and a heating element energizable in proportion to the condition changing pulses provided by said effective one of said control means for influencing the balance of said last-named network to disable said preventing means when the heat supplied by said element falls below a predetermined minimum.

5. A system for controlling separate condition changing means respectively effective to produce changes of opposite sense in the magnitude of a condition, comprising separate condition responsive control means for respectively rendering said condition changing means effective to supply condition changing pulses, each said control means including a control network having circuit elements for producing a controlled variable ratio of on-time to off-time of said pulses, switching means of the latched-in type operable between two positions for selectively rendering said control means effective to control the associated condition changing means, said switching means having oppositely acting operating means respectively controlled by said separate control means, and means effective when said switching means is in either of said two positions for preventing operation thereof to the other of said two positions so long as the one of said control means rendered effective by said switching means is effecting condition changing pulses having a said ratio above a predetermined minimum.

6. A system for controlling separate condition changing means respectively effective to produce changes of opposite sense in the magnitude of a condition, comprising separate condition responsive control means for respectively rendering said condition changing means effective to supply condition changing pulses, a control network for producing a controlled variable ratio of on-time to off-time of said pulses, switching means of the latched-in type operable between two positions for selectively rendering said control means effective to control the associated condition changing means, said switching means having oppositely acting operating means respectively controlled by said separate control means, means including a balanceable network for preventing operation of said switching means between said two positions, and heater means energizable in proportion to the condition changing pulses effected by said condition changing means with said switching means in either of said two positions for varying an impedance in said last-named network to disable said preventing means whenever said ratio of said pulses decreases below a predetermined minimum.

7. A system for controlling separate condition changing means respectively effective to produce changes of opposite sense in the magnitude of a condition, comprising first control means responsive to departures of said condition in one sense from a predetermined value for rendering one of said condition changing means effective, second control means responsive to departures of said condition from said value in the opposite sense for rendering the other of said condition changing means effective, means for disabling said second control means including an element energizable from said first control means in proportion to the degree to which said one condition changing means is rendered effective by said first control means, and means operative upon a substantial departure of said condition from said value for rendering said disabling means ineffective.

8. A system for controlling a heating means and a cooling means to maintain a predetermined temperature, comprising first control means including a balanceable network unbalanced by departure from said predetermined temperature and including modulating means for rendering said heating means effective with automatic adjustment of the ratio of on-time to off-time, second control means for rendering said cooling means effective, means including a balanceable network for disabling said second control means, means energizable from said first control means for varying an impedance in said last-named network in accordance with variation in said ratio to render said disabling means ineffective when said ratio decreases below a predetermined minimum, and means operative upon a substantial departure of the controlled temperature from the predetermined temperature for rendering said disabling means ineffective.

9. A system for controlling separate condition changing means respectively effective to produce changes of opposite sense in the magnitude of a condition, comprising separate condition responsive control means respectively associated with said condition changing means, switching means energizable from either of said control means for rendering the energization of one of said control means effective to control its associated condition changing means, means including a balanceable network for preventing operation of said switching means, a heating element energizable by the effective one of said control means in proportion to the energization of said associated condition changing means for varying an impedance in said network, thereby to disable said preventing means when predetermined minimum condition changes are being effected, and means operative upon a substantial departure of said condition from the desired control point for instantly disabling said preventing means.

10. A system for controlling separate condition changing means respectively effective to produce changes of opposite sense in the magnitude of a condition, comprising separate condition responsive control means for respectively rendering said condition changing means effective to supply condition changing pulses, a control network for producing a controlled variable ratio of on-time to off-time of said pulses, switching means of the latched-in type operable between two positions for selectively rendering said control means effective to control the associated condition changing means, said switching means having oppositely acting operating means respectively controlled by said separate control means, means including a balanceable network for preventing operation of said switching means between said two positions, heater means energizable in accordance with said ratio with said switching means in either of said two positions for varying an impedance in said last-named network to disable said preventing means whenever said ratio decreases below a predetermined minimum, and means operative upon a substantial departure of said condition from the desired control point for immediately disabling said preventing means.

11. A system for maintaining the magnitude of a condition at a predetermined value, comprising separate condition changing means for respectively producing changes of opposite sense in the magnitude of said condition, first control means responsive to the magnitude of said condition including a network having circuit elements cyclically unbalancing the same for rendering one of said condition changing means effective to provide condition changing impulses acting in one sense and having a controlled variable ratio of on-time to off-time, second control means responsive to the magnitude of said condition including a network having circuit elements cyclically unbalancing the same for rendering the other of said condition changing means effective to provide condition changing impulses acting in the opposite sense and having a controlled variable ratio of on-time to off-time, transfer means, means for controlling operation of said transfer means including a balanceable network having a variable impedance therein, and means for varying in the same direction the value of said impedance to unbalance said last-mentioned network in one direction in accordance with the ratio of the on-time to off-time control of either condition changing means to prevent operation of said transfer means to maintain the other of said control means ineffective so long as said on-time to off-time ratio of the condition changing impulses of either condition changing means exceeds a predetermined minimum, said impedance unbalancing said last-named network in the opposite direction for operation of said transfer means when said ratio is below said minimum for a time interval.

12. A system for maintaining the magnitude of a condition at a predetermined value, comprising separate condition changing means for respectively producing changes of opposite sense in the magnitude of said condition, first control means responsive to the magnitude of said condition including a balanceable network having circuit elements for cyclically unbalancing the same for rendering one of said condition changing means effective to provide condition changing impulses acting in one sense and having a controlled variable ratio of on-time to off-time, second control means responsive to the magnitude of said condition including a balanceable network having circuit elements for cyclically unbalancing the same for rendering the other of said condition changing means effective to provide condition changing impulses acting in the opposite sense and having a controlled variable ratio of on-time to off-time, transfer means including an integrator energizable in accordance with said condition changing impulses provided by either of said control means for controlling said transfer means to maintain the other of said control means ineffective so long as the on-time to off-time ratio of said impulses exceeds a predetermined minimum, and means responsive to a substantial departure of said condition from said limits for rendering said other control means immediately effective regardless of the value of said on-time to off-time ratio.

13. A system for maintaining the magnitude of a condition at a predetermined value, comprising separate condition changing means respectively acting to produce changes of opposite sense in the magnitude of said condition, condition sensitive means, first control means responsive to said condition sensitive means including a balanceable network having circuit elements cyclically unbalancing the same for rendering one of said condition changing means effective to provide condition changing impulses acting in one sense and having a controlled variable ratio of on-time to off-time, second control means responsive to said condition sensitive means including a balanceable network having circuit elements cyclically unbalancing the same for rendering the other of said condition changing means effective to provide condition changing impulses acting in the opposite sense and having a controlled variable ratio of on-time to off-time, transfer means for selectively rendering said first or said second control means operative, means including a balanceable network which when unbalanced in one direction prevents operation of said transfer means and upon unbalance in the other direction controls operation of said transfer means, and means including a heater energizable from either operative control means in accordance with said on-time impulses for varying an impedance in said last-named network to unbalance it in said one direction, said heater upon decrease of the on-time to off-time ratio of said impulses below a predetermined minimum being ineffective to maintain said unbalance in said one direction to prevent operation of said transfer means.

14. A system for maintaining the magnitude of a condition at a predetermined value, comprising separate condition changing means for respectively producing changes of opposite sense in the magnitude of said condition, condition sensitive means, first control means responsive to said condition sensitive means including a balanceable network having circuit elements cyclically unbalancing the same for rendering one of said condition changing means effective to provide condition changing impulses acting in one sense and having a controlled variable ratio of on-time to off-time, second control means responsive to said condition sensitive means including a balanceable network having circuit elements cyclically unbalancing the same for rendering the other of said condition changing means effective to provide condition changing impulses acting in the opposite sense and having a controlled variable ratio of on-time to off-time, transfer means for selectively rendering said first or said second control means operative, means including a balanceable network which when unbalanced in one direction prevents operation of said transfer means and when unbalanced in the other direction operates said transfer means, means including a heater energizable from either operative control means in accordance with said impulses for varying an impedance in said last-named network to unbalance said network in said one direction, said heater upon decrease of the on-time to off-time ratio of said impulses below a predetermined minimum being ineffective to maintain said unbalance in said one direction to prevent operation of said transfer means, and means operative upon a substantial departure of said condition from either of said limits for producing operation of said transfer means without regard to the magnitude of said ratio.

15. A system for controlling separate condition changing means respectively effective to produce changes of opposite sense in the magnitude of a condition, comprising separate condition responsive control means respectively associated with said condition changing means, switching means operable between a first position and a second position and disposed between said separate condition responsive control means and said separate condition changing means for rendering one of said control means effective when said switching means is in said first position and the other control means effective when said switching means is in said second position, means including a balanceable network and one of said control means for operating said switching means from its first to its second position and including the other control means for operating said switching means from its said second to its said first position, impedance means in said network, and means operable under the control of the effective one of said control means for varying said impedance means and the balance of said network in accordance with the magnitude of the condition-changing effect and in accordance with the time-duration thereof to prevent operation of said switching means until said effective control means and its associated condition-changing means have for a time interval remained in minimum condition changing positions.

16. A system for controlling separate condition changing means respectively effective to produce changes of opposite sense in the magnitude of a condition, comprising a separate condition responsive control relay for each of said means for partially completing an energizing circuit for rendering effective its associated condition changing means, a transfer switch having normally open and normally closed contacts for completion of one or the other of said circuits for one or the other of said relays, transfer contacts operable by said switching means, a balanceable network having a temperature-variable impedance, a heater coil for changing the value of said impedance, a transfer relay operable from one position to another upon a predetermined change in the balance of said network, an operating coil for actuating said switching means from one to the other of its positions, an energizing circuit therefor including one of said control relays and said transfer relay whereby said actuating coil may not be energized except when said transfer relay is in one of its predetermined positions due to a predetermined balance condition of said network, operation of said switching means upon closure of said energizing circuit serving to terminate control of one condition changing means by one relay and making effective control of the other condition changing means by said other control relay.

17. A system for controlling separate condition changing means respectively effective to produce changes of opposite sense in the magnitude of a condition, comprising separate condition responsive control means respectively associated with said condition changing means, switching means energizable from either of said control means for rendering only one of said control means effective to control its associated condition changing means, a control device in one position preventing operation of said switching means and operable to a second position to permit operation of said switching means by one of said control means, and integrating means operable under the control of the effective one of said control means for preventing operation of said control device to its second-named position so long as the time integral of the condition changing effect of the condition changing means associated with said last-named control means is above a predetermined minimum value.

18. A system for controlling separate condition changing means respectively effective to produce changes of opposite sense in the magnitude of a condition, comprising separate condition responsive control means respectively associated with said condition changing means, switching means operable under the control of either of said control means for rendering only one of said control means effective to control its associated condition changing means, at least one of said control means having circuit elements for varying the operation thereof and of its associated condition changing means to supply condition changing pulses of varying duration, a control device in one position preventing operation of said switching means and operable to a second position to permit operation of said switching means by one of said control means, and integrating means operable under the control of the effective one of said control means for preventing operation of said control device to its second-named position so long as the time integral of said condition changing pulses is above a predetermined minimum value.

19. A system for controlling a condition changing heating means and a condition changing cooling means to maintain a predetermined temperature, comprising a first temperature-responsive control means including a balanceable network unbalanced by departure from said predetermined temperature, said network including circuit elements for cyclically balancing and unbalancing said network for cyclical control of said heating means to produce heating impulses of variable duration, a second temperature-responsive control means associated with said cooling means, switching means energizable from either of said control means for rendering the energizing one of said control means effective to control its associated condition changing means, means including a balanceable network for preventing operation of said switching means, and means controlled by the effective one of said control means for influencing the balance of said network in proportion to the duration of said heating impulses, thereby to disable said preventing means when said network unbalance of said last-named network attains a predetermined value.

20. A system for controlling separate condition changing means respectively effective to produce changes of opposite sense in the magnitude of a condition, comprising first control means responsive to departure of said condition in one sense from a predetermined value for controlling operation of a first of said condition changing means, second control means responsive to departure of said condition from said value in the opposite sense for controlling operation of the second of said condition changing means, transfer means selectively operable by said control means to establish controlled operation of one or the other of said condition changing means by its associated control means, and integrating means operable under the control of said first control means for preventing operation of said transfer means by said second control means so long as the time integral of the condition changing effect of said first condition changing means is above a predetermined minimum.

ELWOOD T. DAVIS.

REFERENCES CITED

The following references are of record in the file of this patent:

UNITED STATES PATENTS

| Number | Name | Date |
|---|---|---|
| 2,291,769 | Smellie | Aug. 4, 1942 |
| 2,495,844 | Hornfeck | Jan. 31, 1950 |